UNITED STATES PATENT OFFICE 3,053,882
Patented Sept. 11, 1962

3,053,882
NORBORNENE AND TRICYCLOHEPTANE ETHER-ESTERS
Lee A. Miller, Dayton, Ohio, assignor to Monsanto Chemical Company, St. Louis, Mo., a corporation of Delaware
No Drawing. Filed Oct. 10, 1960, Ser. No. 61,404
15 Claims. (Cl. 260—468)

This invention relates to alicyclic ether-esters and to the method of preparing the same.

According to the invention, there are provided certain new and valuable ether-substituted 5-norbornene-2-carboxylates and tricycloheptanecarboxylates by the addition reaction of a hydroxy compound or of a thiol with an alkyl 2,5-norbornadiene-2-carboxylate. The addition reaction proceeds with formation of a mixture of the norbornene Compound I and of the isomeric tricycloheptane Compound II, thus:

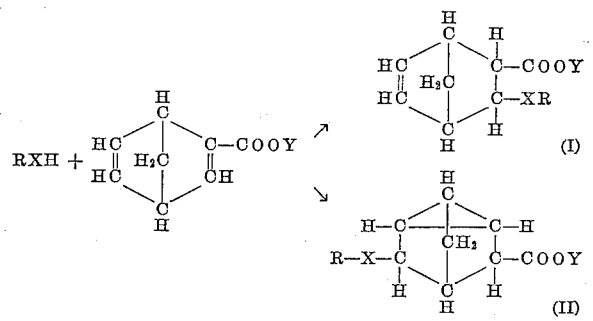

in which R is selected from the class consisting of hydrocarbyl and halohydrocarbyl radicals which are free of olefinic and acetylenic unsaturation and contain from 1 to 12 carbon atoms, X is selected from the class consisting of oxygen and sulfur and Y is an alkyl radical of from 1 to 5 carbon atoms. Compounds I are alkyl 5-norbornene-2-carboxylates having an ether or thioether substituent at the 3-position of the norbornene nucleus, and Compounds II are alkyl tricyclo-[2.2.1.0$^{2,6}$]heptane-3 carboxylates having the ether or thioether substituent at the 5-position of the cyclic structure.

The alkyl 2,5-norbornadiene-2-carboxylates are obtainable in known manner by reaction of cyclopentadiene with an alkyl propiolate. The presently useful carboxylates include the methyl, ethyl, propyl, isopropyl, butyl, isobutyl, tert-butyl, pentyl, isopentyl, and tert-pentyl 2,5-norbornadiene-2-carboxylates.

The presently useful hydroxy compounds or thiols may be aliphatic, cycloaliphatic, aromatic, aliphatic-aromatic, cycloaliphatic-aromatic or aliphatic-cycloaliphatic compounds which may or may not carry halogen substitution, e.g., alcohols such as methanol, ethanol, isopropanol, butanol, pentanol, hexanol, octanol, decanol, dodecanol, cyclopentanol, cyclohexanol, 4 - cyclohexylcyclohexanol, 2-methylcyclopentanol, 2 - chloroethanol, 3,3 - dibromopropanol, 2-fluoroethanol, 3-iodopropanol, 2-chloro-3-bromopropanol, 4,4,3,3-tetrachlorobutanol, trichlorohexanol, dibromononanol, chlorododecanol, 2-chlorocyclohexanol, 4-(trifluoromethyl)cyclohexanol, or 2,3-dibromocyclopentanol; aromatic hydroxy compounds such as phenol, α- or β-naphthol or 4-phenylphenol; aliphatic-aromatic hydroxy compounds such as benzyl alcohol, 4-tert-butylbenzyl alcohol, 2-phenylethanol, 3 - (4 - isopropylphenyl)propanol, 2-, 3- or 4-cresol, 2,3- 3,4- 3,5-, 2,6-, 2,4- or 2,5-xylenol, 4-(2-ethylphenyl)phenol, 2-hexylphenol, β-butyl-α-naphthol pentamethylphenol; halogenated aromatic or aliphatic-aromatic hydroxy compounds such as 2-, 3- or 4-chloro-, bromo-, iodo-, or fluorophenol, 2,3- 3,4- 3,5-, 2,6-, 2,4- or 2,5-dichlorophenol; the corresponding di-bromo-, diiodo- or difluorophenols; the tri-, tetra- or penta- chlorophenols, the tri-, tetra- or penta- bromophenols, the tri-, tetra- or pentaiodophenols; the tri-, tetra- or pentafluorophenols, mixed halophenols such as 2-chloro-4-bromophenol or 2,3-dibromo-4-iodophenol, 4-(4-chlorophenylphenol), α-chloro-β-naphthol, 4-(trifluoromethyl)-phenol, 2,4-dichlorobenzyl alcohol, 3-bromo-4-tert-butylphenol, or 4-(2-chloroethyl)phenol; the cycloaliphatic-aromatic hydroxy compounds such as 4-chlorohexylphenol, 2-phenylcyclopentanol, or 2-chloro-4-cyclopentylphenol, etc.

The presently useful thiols may likewise be aliphatic, cycloaliphatic, aromatic, aliphatic-aromatic, aliphatic-cycloaliphatic or cycloaliphatic-aromatic and they may or may not carry halogen substitution. As examples of such thiols may be mentioned methanethiol, ethanethiol, propanethiol, pentanethiol, octanethiol dodecanethiol 2-chloroethanethiol, dibromohexanethiol, 3 - iodopropanethiol, 4-fluorobutanethiol, benzenethiol, 4-ethylbenzenethiol, β-naphthalenethiol, 4-biphenylthiol, cyclohexanethiol, 2-phenylethanethiol, 4-cyclopentylbenzenethiol, 2-, 3- or 4- chloro-, bromo-, iodo- or fluorobenzenethiol, (2,3-dichlororophenyl)methanethiol, 2 - chloro-4-methylcyclohexanethiol, or α-bromo-β-naphthalenethiol.

Reaction of the dienic carboxylate with the hydroxy compound or the thiol is generally conducted in the presence of a basic or acidic catalyst and in the presence of an inert liquid diluent or solvent. Preferably, an organic basic catalyst is employed. This is particularly desirable when the reaction is effected in the presence of a diluent. Examples of presently useful basic catalysts are, e.g., the heterocyclic nitrogen bases such as N-methylmorpholine, pyridine, quinoline, N-ethylpiperidine, picoline, quinaldine, 4-methylpyrimidine, or N-phenylpyrazole; the tertiary amines such as triethylamine, triamylamine, tri-tert-butylamine, N,N-dimethylaniline and N-benzyl-N-methylaniline; alkylene polyamines such as triethylenediamine; quaternary ammonium compounds such as benzyltrimethylammonium methoxide or tetrabutylammonium butoxide; alkali metal alkoxides such as sodium or potassium methoxide or propoxide, etc. The use of a diluent or solvent in the reaction will depend upon the nature of the reactants as well as upon the reaction conditions employed. When the hydroxy or thiol component is a liquid, a diluent need not be employed, unless this component and/or the dienic ester is extremely reactive. In that case, the use of an inert diluent will serve to moderate the reaction. Activity of the alkyl 2,5-norbornadiene-2-carboxylates generally decreases with increase in the carbon content of the alkyl radical. Reactivity of the hydroxy or thiol component also depends upon the carbon content thereof as well as upon the presence or absence of branched structures and/or halogen. In the aromatic series the presence of halogen often increases activity. The quantity of catalyst will depend upon the nature of the reactants; obviously the more reactive reactants will require less catalyst than will the more sluggish reactants. Whether or not a diluent is used will likewise regulate catalyst quantity. Also variable is the temperature at which reaction is effected; for, here again must be taken into consideration the nature of the reactants, catalyst quantity, and whether or not a diluent is used. While some of the present addition reactions can be conducted at ordinary room temperature or even at decreased temperatures, generally heating of the reaction mixture will be needed. All of these variables, i.e., catalyst quantity, use of diluent and temperature conditions can readily be arrived at by easy experimentation. Very rapid reaction at room temperature, as evidenced by rapid temperature rise will show the need for a diluent and/or lower temperature and/or less catalyst. Conversely, no reaction or only a very slow reaction at room temperature will indicate the use of more extreme conditions, i.e., extraneous heating and/or no diluent and/or more catalyst. Thus, arrival at optimum reaction conditions is simply a matter of routine procedure by one skilled in the art.

Inert liquids which are useful as diluents or solvents in the reaction are liquid hydrocarbons generally, halohydrocarbons, nitrohydrocarbons, and ethers, e.g., benzene, toluene, xylene, hexane, dichlorobenzene, nitrobenzene, ethylene dichloride, carbon tetrachloride, isopropyl ether, dioxane, etc. Generally, any organic material which is non-reactive with either the reactants or the products may be used. Since the reaction occurs by addition of one mole of the hydroxy compound or thiol with one mole of the dienic carboxylate, these reactants are advantageously employed in such stoichiometric proportions. However, an excess of the dienic component may be used.

To recapitulate: In the addition reaction of the norbornadienecarboxylate and the hydroxy compound or thiol, the two reactants are mixed together, preferably in the presence of a basic catalyst and in the presence or absence of an inert diluent or solvent at a temperature which may range from below room temperature to refluxing, say, 125° C., and the resulting mixture is allowed to stand until formation of the mixture of the ether-substituted norbornenecarboxylate and the ether-substituted tricyclohexanecarboxylate has occurred.

Although I do not know the exact mechanism underlying the formation of the mixture of the presently provided alkyl 3-hydrocarbyloxy-, 3-hydrocarbylthio-, 3-halohydrocarbyloxy- or 3-halohydrocarbylthio-5-norbornene-2-carboxylates (I) and of the alkyl 5-hydrocarbyloxy-, 5-hydrocarbylthio-, 5-halohydrocarbyloxy or 5-halohydrocarbylthiotricyclo[2.2.1.0$^{2,6}$]heptane-3-carboxylate (II), it is believed that addition of the hydroxy compound or thiol to the dienic compound takes place in the first case at the 2,3-olefinic bond and by conjugated addition in the second case. The mixture of (I) and (II) which is obtained may be used directly for some purposes, e.g., as biological toxicants. However (I) and (II) are readily separated from each other by fractional distillation, solvent extraction, or by employing other isolating procedures known to those skilled in the art.

Examples of the presently provided compounds and of the hydroxy compound or thiol and the alkyl 2,5-norbornadiene-2-carboxylate from which they are obtained according to this invention are shown below, wherein the 2,5-norbornadiene nucleus of the starting dienic carboxylate is denoted as "D," the 5-norbornene nucleus of the olefinic product (I) is denoted as "X" and the tricyclo[2.2.1.0$^{2,6}$]-heptane nucleus of the saturated product is denoted as "Z."

Methyl 3-ethoxy-X-2-carboxylate and methyl 5-ethoxy-Z-3-carboxylate from ethanol and methyl D-2-carboxylate.

Butyl 3-phenoxy-X-2-carboxylate and butyl 5-phenoxy-Z-3-carboxylate from phenol and butyl D-2-carboxylate.

Methyl 3-propylthio-X-2-carboxylate and methyl 5-propylthio-Z-3-carboxylate from propanethiol and methyl D-2-carboxylate.

Pentyl 3 - (2,4 - dichlorophenoxy)-X-2-carboxylate and pentyl 5-(2,4-dichlorophenoxy)-Z-3-carboxylate from 2,4-dichlorophenol and pentyl D-2-carboxylate.

Ethyl 3-phenylthio-X-2-carboxylate and ethyl 5-phenylthio-Z-3-carboxylate from benezenethiol and ethyl D-2-carboxylate.

Isopropyl 3-benzyloxy-X-2-carboxylate and isopropyl 5-benzyloxy-Z-3-carboxylate from benzyl alcohol and isopropyl D-2-carboxylate.

Methyl 3-cyclohexyloxy-X-2-carboxylate and methyl 5-cyclohexyloxy - Z - 3 - carboxylate from cyclohexanol and methyl D-2-carboxylate.

Tert-butyl 3-(2-fluoroethoxy)-X-2-carboxylate and tert-butyl 5-(2-fluoroethoxy)-Z-3-carboxylate from 2-fluoroethanol and tert-butyl D-2-carboxylate.

Ethyl 3(4-hexylphenoxy)-X-2-carboxylate and ethyl 5-(4 - hexylphenoxy)-Z-3-carboxylate from 4 - hexylphenol and ethyl D-2-carboxylate.

Methyl 3 - (4-trichloromethylbenzyloxy)-X-2-carboxylate and methyl 5-(4-trichloromethylbenzyloxy)-Z-3-carboxylate from 4-trichloromethylbenzyl alcohol and methyl D-2-carboxylate.

Propyl 3-α-naphthyloxy-X-2-carboxylate and propyl 5-α-naphthyloxy - Z - 3 - carboxylate from α-naphthol and propyl D-2-carboxylate.

Isobutyl 3-m-tolylthio-X-2-carboxylate and isobutyl 5-m-tolylthio-Z-3-carboxylate from m-thiocresol and isobutyl D-2-carboxylate.

Methyl 3-octylthio-X-2-carboxylate and methyl 5-octylthio-Z-3-carboxylate from octanethiol and methyl D-2-carboxylate.

Tert-pentyl 3 - (2 - bromophenylthio)-X-2-carboxylate and tert-pentyl 5 - (2 - bromophenylthio)-Z-3-carboxylate from 2-bromobenzenethiol and tert-pentyl D-2-carboxylate.

Methyl 3-dodecyloxy-X-2-carboxylate and methyl 5-dodecyloxy-Z-3-carboxylate from dodecanol and methyl D-2-carboxylate.

Ethyl 3-xenyloxy-X-2-carboxylate and ethyl 5-xenyloxy-Z-3-carboxylate from 4-phenylphenol and ethyl D-2-carboxylate.

Butyl 3-(3,3-diiodopropoxy)-X-2-carboxylate and butyl 5-(3,3-diiodopropoxy)-Z-3-carboxylate from 3,-diiodopropanol and butyl D-2-carboxylate.

Isopropyl 3-(2-phenylethoxy)-X-2-carboxylate and isopropyl 5-(2-phenylethoxy)-Z-3-carboxylate from 2-phenylethanol and isopropyl D-2-carboxylate.

Methyl 3-(2-chlorocyclopentoxy)-X-2-carboxylate and methyl 5-(2-chlorocyclopentoxy)-Z-3-carboxylate from 2-chlorocyclopentanol and methyl D-2-carboxylate.

Ethyl 3-pentoxy-X-2-carboxylate and ethyl 5-pentoxy-Z-3-carboxylate from pentanol and ethyl D-2-carboxylate.

The presently provided ether-substituted cyclic esters or mixtures thereof are stable compositions which range from viscous liquids to waxy or crystalline solids which are advantageously employed for a variety of industrial and agricultural purposes. Both the bicyclo olefinic Compounds I and the tricyclo Compounds II possess fungistat and preemergent herbicide effect. The olefinic Compounds I are readily polymerizable and are especially useful as comonomers with vinyl compounds such as styrene, vinyl acetate, vinyl chloride or acrylonitrile in the preparation of synthetic resinous copolymers for use in the coatings and in plastics technology, e.g., as casting, molding and extrusion.

The invention is further illustrated by, but not limited to, the following examples:

*Example 1*

To a mixture consisting of 26 g. (0.173 mole) of methyl 2,5-norbornadiene-2-carboxylate, 100 ml. of benzene and 1 ml. of methanolic benzyltrimethylammonium methoxide there was added 5.5 g. (0.172 mole) of methanol. The color of the reaction mixture changed to light brown. The whole was refluxed for 12 hours, benzene was removed under reduced pressure, and the residual oil was fractionated to give a mixture of methyl 3-methoxy-5-norbornene-2-carboxylate and methyl 5-methoxytricyclo[2.2.1.0$^{2,6}$]heptane-3-carboxylate. The mixture was used directly, i.e., without separation of the isomers, against the tomato leaf spot fungus and the tomato blight fungus. Suppressing effect on these organisms was determined at a 0.1% concentration of said mixture.

*Example 2*

A mixture consisting of 16.3 g. (0.1 mole) of 2,4-dichlorophenol, 15 g. (0.1 mole) of methyl 2,5-norbornadiene-2-carboxylate, 100 ml. of benzene and 1 ml. of benzyltrimethylammonium methoxide was refluxed for 12 hours. The resulting pale yellow mixture was stripped of the benzene and the residue was distilled under reduced pressure to remove material boiling below 63° C./0.1 mm. There was thus obtained as residue an 18.4 g.

of a mixture of methyl 3-(2,4-dichlorophenoxy)-5-norbornene-2-carboxylate and methyl 5-(2,4-dichlorophenoxy)tricyclo[2.2.1.0²,⁶]heptane-3-carboxylate.

Example 3

To a mixture consisting of 15.0 g. (0.1 mole) of methyl 2,5-norbornadiene-2-carboxylate, 100 ml. of benzene and 1 ml. of methanolic benzyltrimethylammonium methoxide there was added 11.0 g. (0.1 mole) of benzenethiol. A slight exothermic reaction occurred and the mixture turned cloudy; upon heating, however, it turned to a pale yellow solution. After refluxing the whole for 12 hours, the benzene was removed under reduced pressure and the residual, pale yellow oil was distilled under vacuum to give 18.5 g. of a fraction B.P. 145–148° C./0.4 mm., $n_D{}^{25}$ 1.15720–5, consisting essentially of methyl 3-phenylthio-5-norbornene-2-carboxylate and methyl 5-phenylthiotricyclo[2.2.1.0²,⁶]heptane-3-carboxylate. Said fraction analyzed as follows:

|  | Found | Calc'd for $C_{15}H_{16}O_2S$ |
| --- | --- | --- |
| Percent C | 69.65 | 69.20 |
| Percent H | 6.46 | 6.20 |
| Percent S | 12.51 | 12.29 |

The mixture of methyl 3-phenylthio-5-norbornene-2-carboxylate and methyl 5-phenylthiotricyclo[2.2.1.0²,⁶]heptane-3-carboxylate was found to have a suppressing effect on tomato blight fungus and on Rhyisoctonia soil fungus at an 0.1% concentration. When tested as a pre-emergent herbicide at a concentration of 25 pounds per acre, it completely prevented the germination and growth of brome grass while showing no effect against tomato, radish, morning glory, wild oat and rye grass. The compound thus not only has selective effect as between narrow and broad leaf plants, but it is also of interest in that it possesses discriminatory action within the class of narrow leaf plants.

What I claim is:

1. An alicyclic ether-ester selected from the class consisting of a norbornene compound of the formula

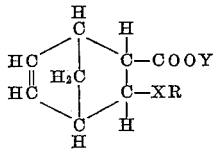

and a tricycloheptane compound of the formula

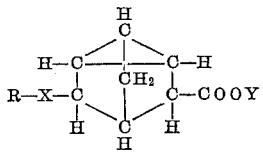

in which R is selected from the class consisting of hydrocarbon and halohydrocarbon radicals which are free of olefinic and acetylenic unsaturation and contain from 1 to 12 carbon atoms, X is selected from the class consisting of oxygen and sulfur and Y is an alkyl radical of from 1 to 5 carbon atoms.

2. Alkyl 3-hydrocarbonoxy-5-norbornene-2-carboxylate wherein the alkyl radical has from 1 to 5 carbon atoms and the hydrocarbon radical is free of olefinic and acetylenic unsaturation and contains from 1 to 12 carbon atoms.

3. Alkyl 3-hydrocarbonthio-5-norbornene-2-carboxylate wherein the alkyl radical has from 1 to 5 carbon atoms and the hydrocarbon radical is free of olefinic and acetylenic unsaturation and contains from 1 to 12 carbon atoms.

4. Alkyl 5-hydrocarbonoxytricyclo[2.2.1.0²,⁶]heptane-3-carboxylate wherein the alkyl radical has from 1 to 5 carbon atoms and the hydrocarbon radical is free of olefinic and acetylenic unsaturation and contains from 1 to 12 carbon atoms.

5. Alkyl 5-hydrocarbonthiotricyclo[2.2.1.0²,⁶]heptane-3-carboxylate wherein the alkyl radical has from 1 to 5 carbon atoms and the hydrocarbon radical is free of olefinic and acetylenic unsaturation and contains from 1 to 12 carbon atoms.

6. A mixture of methyl 3-methoxy-5-norbornene-2-carboxylate and methyl 5-methoxytricyclo[2.2.1.0²,⁶]heptane-3-carboxylate.

7. A mixture of methyl 3-(2,4-dichlorophenoxy)-5-norbornene-2-carboxylate and methyl 5-(2,4-dichlorophenoxy)-tricyclo[2.2.1.0²,⁶]heptane-3-carboxylate.

8. Methyl 3-phenylthio-5-norbornene-2-carboxylate.

9. Methyl 5-phenylthiotricyclo[2.2.1.0²,⁶]heptane-3-carboxylate.

10. The method which comprises contacting, in the presence of a basic catalyst and an inert diluent, alkyl 2,5-norbornadiene-2-carboxylate wherein the alkyl radical has from 1 to 5 carbon atoms with a compound of the formula RXH in which R is selected from the class consisting of hydrocarbon and halohydrocarbon radicals which are free of olefinic and acetylenic unsaturation and contain from 1 to 12 carbon atoms and X is selected from the class consisting of oxygen and sulfur, and recovering from the resulting reaction product an alicyclic ether-ester selected from the class consisting of a norbornene compound of the formula

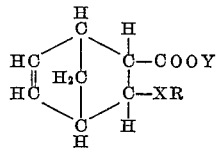

and a tricycloheptane compound of the formula

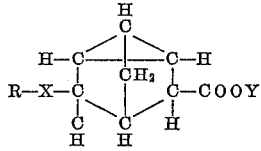

in which R and X are as above defined and Y is an alkyl radical of from 1 to 5 carbon atoms.

11. The method which comprises contacting, in the presence of a basic catalyst and an inert diluent, alkyl 2,5-norbornadiene-2-carboxylate with an alkanol of from 1 to 12 carbon atoms to obtain a mixture of an alkyl 3-alkoxy-5-norbornene-2-carboxylate having from 1 to 5 carbon atoms in the alkyl radical and from 1 to 12 carbon atoms in the alkoxy radical and an alkyl 5-alkoxytricyclo[2.2.1.0²,⁶]heptane-3-carboxylate having from 1 to 5 carbon atoms in the alkyl radical and from 1 to 12 carbon atoms in the alkoxy radical.

12. The method which comprises contacting methyl 2,5-norbornadiene-2-carboxylate with methanol, in the presence of a basic catalyst and an inert diluent, to obtain a mixture of methyl 3-methoxy-5-norbornene-2-carboxylate and methyl 5-methoxytricyclo[2.2.1.0²,⁶]heptane-3-carboxylate.

13. The method which comprises contacting methyl 2,5-norbornadiene-2-carboxylate with 2,4-dichlorophenol in the presence of a basic catalyst and an inert diluent, to obtain a mixture of methyl 3-(2,4-dichlorophenoxy)-5-norbornene-2-carboxylate and methyl 5-(2,4-dichlorophenoxy)tricyclo[2.2.1.0²,⁶]heptane-3-carboxylate.

14. The method which comprises contacting methyl 2,5-norbornadiene-2-carboxylate with benzenethiol, in the presence of a basic catalyst and an inert diluent, and recovering methyl 3 - phenylthio - 5 - norbornene-2-carboxylate from the resulting reaction product.

15. The method which comprises contacting methyl 2,5 - norbornadiene - 2 - carboxylate with benzenethiol, in the presence of a basic catalyst and an inert diluent, and recovering methyl 5 - phenylthiotricyclo[2.2.1.0$^{2,6}$]-heptane - 3 - carboxylate from the resulting reaction product.

References Cited in the file of this patent

UNITED STATES PATENTS 2,730,548   Bluestone et al. _____ Jan. 10, 1956

OTHER REFERENCES

Cristol et al.: JACS, 80, 635, 40 (1958).